United States Patent [19]
Jackson et al.

[11] Patent Number: 5,318,859
[45] Date of Patent: * Jun. 7, 1994

[54] CLAD STRUCTURAL MEMBER WITH NBTIAL ALLOY CLADDING AND NIOBIUM BASE METAL CORE

[75] Inventors: Melvin R. Jackson, Niskayuna; Mark G. Benz, Burnt Hills; John R. Hughes, Scotia, all of N.Y.

[73] Assignee: General Electric Company, Schenectady, N.Y.

[*] Notice: The portion of the term of this patent subsequent to Dec. 14, 2010 has been disclaimed.

[21] Appl. No.: 953,701

[22] Filed: Sep. 30, 1992

[51] Int. Cl.$^5$ .............................................. C22C 1/09
[52] U.S. Cl. ..................................... 428/614; 428/660
[58] Field of Search .............. 428/614, 660, 661, 662; 420/426, 580

[56] References Cited

U.S. PATENT DOCUMENTS

| | | | |
|---|---|---|---|
| 3,540,863 | 11/1970 | Princeman et al. | 428/662 |
| 3,567,407 | 3/1971 | Yoblin | 428/614 |
| 3,753,699 | 8/1973 | Anderson | 420/426 |
| 4,314,007 | 2/1982 | Gessinger | 428/614 |
| 5,019,334 | 5/1991 | Jackson | 420/426 |

FOREIGN PATENT DOCUMENTS

| | | | |
|---|---|---|---|
| 43-2818 | 2/1968 | Japan . | |
| 47-21357 | 6/1972 | Japan . | |
| 47-2559 | 7/1972 | Japan . | |
| 55-110747 | 8/1980 | Japan . | 428/614 |
| 1-215937 | 8/1989 | Japan . | |

OTHER PUBLICATIONS

"Creep Behavior of Tungsten/Niobium and tungsten/-Niobium-1 Percent Zirconium Composites", Donald W. Petrasek, Robert H. Titran, Report No. DOE/-NASA/16310-5 NASA TM-100804, Jan. 11-14, 1988, pp. 1-21.
"The Properties of Columbium-Titanium-Tungsten Alloy Part 1 Oxidation", ST Wlodek, Columbium Metal., D. Douglass et al., AIME Metallurgical Society Conferences, vol. 10, Interscience Publishers, NY, 1961, pp. 175-203. no month.
"The Properties of Cb-Al-V Alloys. Part I. Oxidation", ibid, pp. 553-583., 1961. no month.
"Fused Slurry Silicide Coatings for the Elevated Temperature Oxidation of Columbium Alloys", S. Priceman & L. Sama, Refractory Metals & Alloys IV-TMS Conf. Proc., vol. II, RI, G.M. Jaffee et al., eds., Gordon & Breach Science Pbls., N.Y., 1966, pp. 959, 982. no month.
"Mechanical Behavior of Nb-Ti Base Alloys", M. R. Jackson, K. D. Jones, Refractory Metals, etc., K. C. Liddell et al. eds., TMS, Warrendale, Pa., 1990, pp. 311-320. no month.
"Response of Nb-Ti Alloys to High Temperature Air Exposure", M. R. Jackson, K. D. Jones, C. C. Huang, L. A. Peluso, CR&D Technical Report No. 90CRD182, Sep. 1990, pp. 1-15.
"Tensile and Creep-Rupture Behavior of P/M Processed Nb-Base Alloy, WC-3009", M. G. Hebsur, R. H. Titran, Refractory Metals: State-of-the-Art 1988, P. Kumar, R. L. Ammon, eds., TMS, Warrendale, Pa., 1989, pp. 39-48. no month.
"Refractory Metals Structures Produced by Low Pressure Plasma Deposition", M. R. Jackson, P. A. Siemers, S. F. Rutkowski, G. Frind, ibid., pp. 107-118. no month.
"Diffusion in Solids", P. G. Shewmon, McGraw Hill, NY 1963, pp. 62-66. no month.
"High-Strength, High-Temperature Intermetallic Compounds", R. L. Fleischer, Technical Information Series, GE Corporate Research & Development, Dec. 1986, pp. 1-8 (expanded version of High-Temperature, High-Strength Materials-An Overview, R. L. Fleischer, J. Met., 37, 1985. (16-20).
"The Impact of IHPTET on the Engine/Aircraft System", P. R. Viars, AIAA/AHS/ASEE Aircraft Design, Systems and Operations Conference, Seattle, Wash./Jul. 31-Aug. 2, 1989, pp. 1-8.

Primary Examiner—Michael Lewis
Assistant Examiner—N. M. Nguyen
Attorney, Agent, or Firm—James Magee Jr.

[57] ABSTRACT

Composite structures having a higher density, stronger reinforcing niobium based alloy embedded within a lower density, lower strength niobium based cladding alloy are provided. The cladding is preferably an alloy having a niobium and titanium base according to the expression:

$$Nb_{balance}\text{-}Ti_{31-48}\text{-}Al_{8-21}.$$

The reinforcement may be in the form of plates, sheets or rods of the higher strength, higher temperature niobium based reinforcing alloy. The same crystal form is present in both the matrix and the reinforcement and is specifically body centered cubic crystal form.

6 Claims, 9 Drawing Sheets

500 Microns

CLAD STRUCTURAL MEMBER WITH NBTIAL ALLOY CLADDING AND NIOBIUM BASE METAL CORE

CROSS-REFERENCE TO RELATED APPLICATIONS

This application relates to copending U.S. patent applications:
Ser. No. 907,949, filed Jul. 2, 1992; Ser. No. 816,164, filed Jan. 2, 1992; and Ser. Nos. 07/814,794, 07/815,797, 07/816,161, and 07/816,165, all filed Jan. 2, 1992;
Ser. No. 953,700, filed Sep. 30, 1992; Ser. No. 953,702, filed Sep. 30, 1992; Ser. No. 953,911, filed Sep. 30, 1992; Ser. No. 953,907, filed Sep. 30, 1992; and Ser. No. 953,910, filed Sep. 30, 1992.

BACKGROUND OF THE INVENTION

The present invention relates to composite metal structure sin which a metal cladding having a lower density and a lower tensile strength at high temperature is reinforced by a core of a metal present in higher volume fraction and having both higher tensile strength and higher density than that of the cladding. The invention further relates to the reinforcement of lower density metal clad structures having a niobium titanium base cladding and a higher oxidation resistance, with metal core elements having a lower oxidation resistance as well as higher density and higher strength.

The invention additionally relates to body centered cubic metal structures in which a metal cladding having a lower density and a lower tensile strength at high temperature is reinforced by core elements of a metal present in higher volume fraction and having both higher tensile strength and higher density than that of the cladding. Lastly, the invention relates to metal-metal composite structures in which a lower density metal clad having a niobium titanium base and a higher oxidation resistance is reinforced with denser, but stronger, niobium base metal reinforcing elements having a lower oxidation resistance.

It is known that niobium base alloys have useful strength in temperature ranges at which nickel and cobalt base superalloys begin to show incipient melting. This incipient melting temperature is in the approximately 2300° to 2400° F. range. The use of the higher melting niobium base metals in advanced jet engine turbine hot sections would allow higher metal temperatures than are currently allowed. Such use of the niobium base alloy materials could permit higher flame temperatures and would also permit production of greater power at greater efficiency. Such greater power production at greater efficiency would be at least in part due to a reduction in cooling air requirements.

The commercially available niobium base alloys have high strength and high density but have very limited oxidation resistance in the range of 1600° F. to 2400° F. Silicide coatings exist which might offer some protection of such alloys at temperatures up to 2400° F., but such silicide coatings are brittle enough that premature failure of the coating could be encountered where the coated part is highly stressed. The commercially available niobium base alloys also have high densities ranging from a low value of 8.6 grams per cubic centimeter for relatively pure niobium to values of about 10 grams per cubic centimeter for the strongest alloys.

Certain alloys having a niobium-titanium base have much lower densities of the range of 6–7 grams per cubic centimeter. A group of such alloys are the subject matter of commonly owned U.S. Pat. Nos. 4,956,144; 4,990,308; 5,006,307; 5,019,334; and 5,026,522. Such alloys can be formed into parts which have significantly lower weight than the weight of the presently employed nickel and cobalt superalloys as these superalloys have densities ranging from about 8 to about 9.3 grams per cubic centimeter. One of these patents, U.S. Pat. No. 5,019,334, concerns an alloy having the following composition in atom percent:

| Ingredient | Concentration Range |
|---|---|
| niobium | balance |
| titanium | 31–48% |
| aluminum | 8–21% |

A number of additional niobium based alloys are also the subject of commonly owned U.S. Patents. These are U.S. Pat. Nos. 4,890,244; 4,931,254; has uniquely valuable sets of properties but has densities which are higher than those of the other alloys. Commonly owned U.S. Pat. No. 4,904,546 concerns an alloy system in which a niobium base alloy is protected from environmental attack by a surface coating of an alloy highly resistant to oxidation and other atmospheric attack. Commonly owned copending applications, listed in the cross-reference section above pertain principally to matrix type composites in which reinforcement and matrix alloys are intimately intermixed and the relevant reinforcement ratios, as defined below, is above 50 and preferably above 100. By contrast the composites of the invention have reinforcement ratios below 50.

In devising alloy systems for use in aircraft engines the density of the alloys is, of course, a significant factor which often determines whether the alloy is the best available for use in the engine application. The nickel and cobalt based superalloys also have much greater tolerance to oxygen exposure than the commercially available niobium based alloys. The failure of a protective coating on a nickel or cobalt superalloy is a much less catastrophic event than the failure of a protective coating on many of the niobium based alloys and particularly the commercially available niobium based alloys. The oxidation resistance of the niobium based alloys of the above commonly owned patents is intermediate between the resistance of commercial Nb base alloys and that of the Ni- or Co-based superalloys.

While the niobium based alloys of the above commonly owned patents are stronger than wrought nickel or cobalt based superalloys at high temperatures, they are much weaker than cast or directionally solidified nickel or cobalt based superalloys at these higher temperatures. However, for many engine applications, structures formed by wrought sheet fabrication are used, since castings of sheet structures cannot be produced economically in sound form for these applications.

The advantage of use of niobium based structures is evidenced by the fact that the niobium based alloys can withstand 3 ksi for 1000 hours at temperatures of 2100° F. The nickel and cobalt based wrought superalloys, by contrast, can withstand 3 ksi of stress for 1000 hours at only 1700° to 1850° F.

What is highly desirable in general for aircraft engine use is a structure which has a combination of lower density, higher strength at higher temperatures, good ductility at room temperature, and higher oxidation resistance. We have devised metal-metal clad composite structures which have such a combination of properties.

A number of articles have been written about use of refractory metals in high temperature applications. These articles include the following:

(1) Studies of composite structures of tungsten in niobium were performed at Lewis Research Center by D. W. Petrasek and R. H. Titran and are reported in a report entitled "Creep Behavior of Tungsten/Niobium and Tungsten/Niobium-1 Percent Zirconium Composites" and identified as Report No. DOE/NASA/163-10-5 NASA TM-100804, prepared for Fifth Symposium on Space Nuclear Power Systems, University of New Mexico, Albuquerque, N.M. (Jan. 11–14 1988). No studies of reinforcing niobium base matrices with niobium base structures, nor the unique benefits of such reinforcing, is taught in this report.

(2) S. T. Wlodek, "The Properties of Cb-Ti-W Alloys, Part I", Oxidation, Columbium Metallurgy, D. Douglass and F. W. Kunz, eds., AIME Metallurgical Society Conferences, vol. 10, Interscience Publishers, New York (1961) pp. 175–204.

(3) S. T. Wlodek, "The Properties of Cb-AI-V Alloys, Part I", Oxidation, ibid., pp. 553–584.

(4) S. Priceman and L. Sama, "Fused Slurry Silicide Coatings for the Elevated Temperature Oxidation of Columbium Alloys", Refractory Metals and Alloys IV - TMS Conference proceedings, French Lick, IN, Oct. 3–5, 1965, vol. II, R. I. Jaffee, G. M. Ault, J. Maltz, and M. Semchyshen, eds., Gordon and Breach Science Publisher, New York (1966) pp. 959–982.

(5) M. R. Jackson and K. D. Jones, "Mechanical Behavior of Nb-Ti Base Alloys", Refractory Metals: Extraction, Processing and Applications, K. C. Liddell, D. R. Sadoway, and R. G. Bautista, eds., TMS, Warrendale, Pa. (1990) pp. 311–320.

(6) M. R. Jackson, K. D. Jones, S. C. Huang, and L. A. Peluso, "Response of Nb-Ti Alloys to High Temperature Air Exposure", ibid., pp 335–346.

(7) M. G. Hebsur and R. H. Titran, "Tensile and Creep Rupture Behavior of P/M Processed Nb-Base Alloy, WC-3009", Refractory Metals: State-of-the-Art 1988, P. Kumar and R. L. Ammon, eds., TMS, Warrendale, Pa. (1989) pp. 39–48.

(8) M. R. Jackson, P. A. Siemers, S. F. Rutkowski, and G. Frind, "Refractory Metal Structures Produced by Low Pressure Plasma Deposition", ibid., pp. 107–118.

BRIEF STATEMENT OF THE INVENTION

In one of its broader aspects, objects of the present invention can be achieved by embedding at least one reinforcing structure of a niobium base metal of higher density, greater high temperature tensile strength and lower oxidation resistance within a niobium base clad metal of lower density, lower strength and higher oxidation resistance having the following composition in atom percent:

$$Nb_{balance}Ti_{31-48}Al_{8-21}.$$

In another of its broader aspects, objects of the present invention can be achieved by embedding at least one niobium base metal structure having a body centered cubic crystal form and having higher density and greater high temperature strength as well as a lower oxidation resistance in a sheath having a niobium titanium base and having lower density, lower strength and higher oxidation resistance and having the following composition:

$$Nb_{balance}Ti_{32-38}Al_{9.5-18.5}.$$

The reinforcement ratio of the structure is no more than 50 as explained below.

BRIEF DESCRIPTION OF THE DRAWINGS

The description which follows will be understood with greater clarity if reference is made to the accompanying drawings in which.

DETAILED DESCRIPTION OF THE INVENTION

Pursuant to the present invention, clad composite structures are formed incorporating at least one strong, ductile metallic reinforcing element in a ductile, low density, more oxygen-resistant sheath to achieve greater high temperature tensile and rupture strengths than can be achieved in an article of the same dimensions formed solely of the sheath metal by itself and to avoid oxidative degradation of the reinforcing element or elements.

Both the reinforcement composition and the sheath composition are high in niobium metal. Further, both the sheath and the reinforcement have the same general crystalline form and specifically a body centered cubic crystal structure. In this way, many of the problems conventionally related to incompatibility of or interaction between a conventional reinforcement and a conventional cladding to form brittle intermetallics or other undesirable reaction products are deemed to be avoided. If a composite of this invention containing a sheet form of reinforcement is heated for long times at high temperature, the sheet and its cladding are mutually soluble so that even a high degree of interdiffusion does not result in embrittlement. However, where clad composites of this invention are used for normal service lives and temperatures, very little interdiffusion and very little degradative alteration of the respective properties of the cladding and reinforcement are deemed likely.

As used herein, the term "cladding" is meant to designate a relatively thin continuous layer of the metal having the lower density and higher resistance to oxidation. The cladding must be of sufficient thickness so that oxygen cannot readily penetrate the cladding layer to interact deleteriously with the surface of the reinforcement beneath the cladding. Also, in general, the reinforcement layer must have a sufficient bulk and thickness to provide a reinforcing function so that the strength of the clad composite article is greater than a structure having the same volume of metal but formed only of the more oxidation resistant material. Further, the cladding portion of the clad composite is sometimes referred to by other terms such as "sheath" or "envelope", or the like, but the meaning is essentially the same as that of "cladding". In some respects, the terminology employed has something to do with the manner in which the clad composite is formed. For example, if the clad composite is formed by coextrusion of elements as, for example, in forming a rod-like element, a term, such as "envelope", "cladding", or "sheath" may be appropriate to describe the protective layer of niobium base metal which envelops the reinforcing core. A similar designation would apply also to a clad composite strip formed by a coextrusion.

The thickness required for a cladding in order to prevent excessive interdiffusion and loss of the benefit of the cladding depends on the projected temperature of use of the clad composite article. The relationship between thickness and diffusion is explained more fully below.

In general, the fabrication techniques for forming such clad composites involve embedding at least one higher strength, higher density ductile niobium base alloy body in an enveloping sheath of the lower density, lower strength ductile niobium base alloy and forming and shaping the combination of materials into a clad composite body. In this way, it is possible to form a clad composite which is strengthened by the greater high temperature strength of the higher density core niobium alloy and which clad composite also enjoys the environmental resistance properties of the weaker cladding material.

The following examples illustrate some of the techniques by which the composites may be prepared and the properties achieved as a result of such preparation. While these examples relate principally to matrix type composites of the cross-referenced applications, the advantages achieved are deemed to apply as well to clad type composites of this invention.

EXAMPLES 1 and 2

Two melts of matrix alloys were prepared and ingots were prepared from the melts. The ingots had compositions as listed in Table I immediately below.

TABLE I

| Matrix Alloy 108: | 40 Nb | 40 Ti | 10 Al | 8 Cr | 2 Hf |
| Matrix Alloy 124: | 49 Nb | 34 Ti | 8 Al | 7 Cr | 2 Hf |

The alloys prepared were identified as alloys 108 and 124. The composition of the alloys is given in Table I in atom percent. The alloy 108 containing 40 atom percent titanium and 40 atom percent niobium is a more oxygen resistant or oxygen tolerant alloy, and the matrix alloy identified as alloy 124 containing 34 atom percent titanium and 49 atom percent niobium is the stronger of the two matrix alloy materials at high temperature.

A Wah Chang commercial niobium based reinforcing alloy was obtained containing 30 weight percent of hafnium and 9 weight percent of tungsten in a niobium base. The alloy was identified as WC3009.

A cast ingot of each of the matrix alloy compositions was first prepared in cylindrical form. Seven holes were drilled in each of the ingots of cast matrix alloy to receive seven cylinders of the reinforcing material. The seven holes were in an array of six holes surrounding a central seventh hole. Each of the reinforcing cylinders to be inserted in the prepared holes was formed of the WC3009 metal and was 0.09 inch in diameter and 2.4 inches in length. Seven dimensionally conforming cylinders were placed in the 7 drilled holes in each of the cast matrix alloy samples. Each assembly was then enclosed in a jacket of molybdenum metal and was subjected to an 8 to 1 extrusion reduction.

After the first extrusion, a three inch length was cut from the extruded composite billet and the three inch length was placed in a second conforming molybdenum jacket and subjected to a second extrusion operation to produce an 8 to 1 reduction. Total cross-sectional area reduction of the original billet was 64 to 1.

Figure 1:
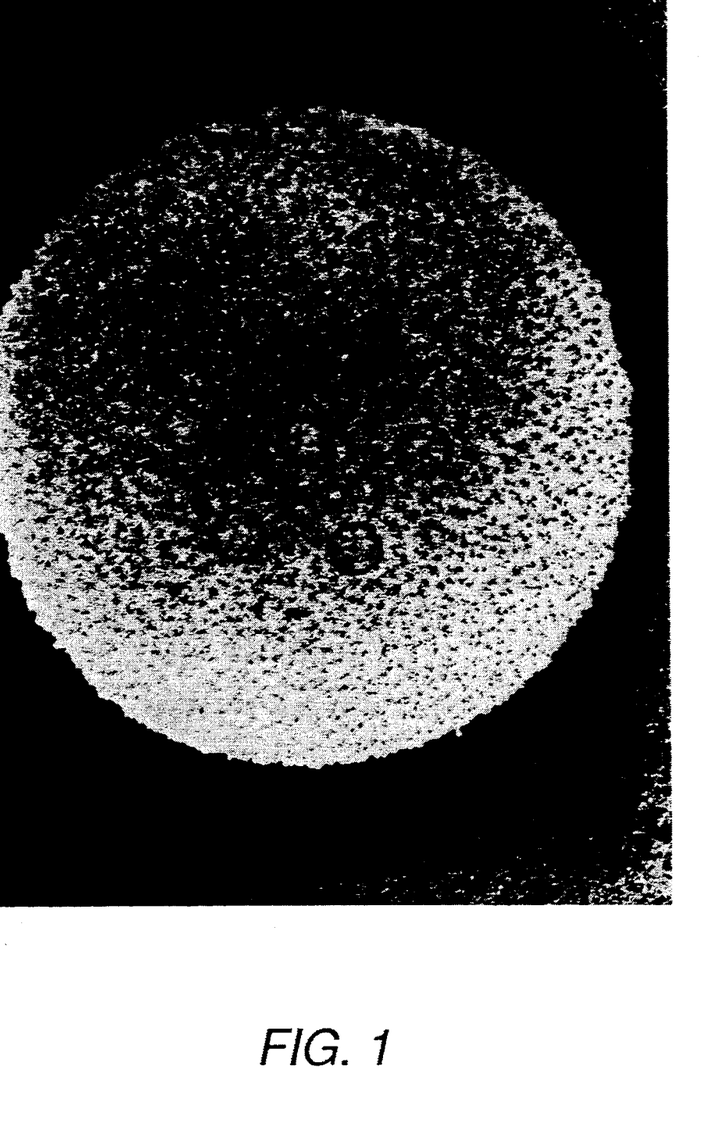
FIG. 1 is a photomicrograph of the cross section of a billet prepared by coextruding elements.

A photomicrograph of the cross section of a twice extruded billet and of the contained reinforcing strands is provided in FIG. 1.

Seven sections were cut from the twice extruded billet and each section was accorded a four hour heat treatment in argon at temperatures as follows: 815° C.; 1050° C.; 1100° C.; 1150° C.; 1200° C.; 300° C.; and 1400° C.

Grain size measurements were made for both the reinforcing fiber and the matrix on each of these sections of the extruded billet. The initial grain sizes of the matrix portions of the billet sections prior to heat treatment were less than 20μm. The initial grain sizes were grown to 50 to 100μm by the 1100° C. heat treatment and to 200 to 300μm by the 1400° C. heat treatment. The matrix having the higher titanium concentration displayed the greater grain growth.

The grain size in the reinforcing WC3009 fiber could not be measured optically for the as-extruded fiber nor could it be measured for the fiber after the 815° C. heat treatment. The grain size was about 5μm for the WC3009 fiber which had been treated at the 1050° C. temperature. The grain size of the fiber was less than 25μm for the sample which had been heat treated at 1400° C.

Figure 2:
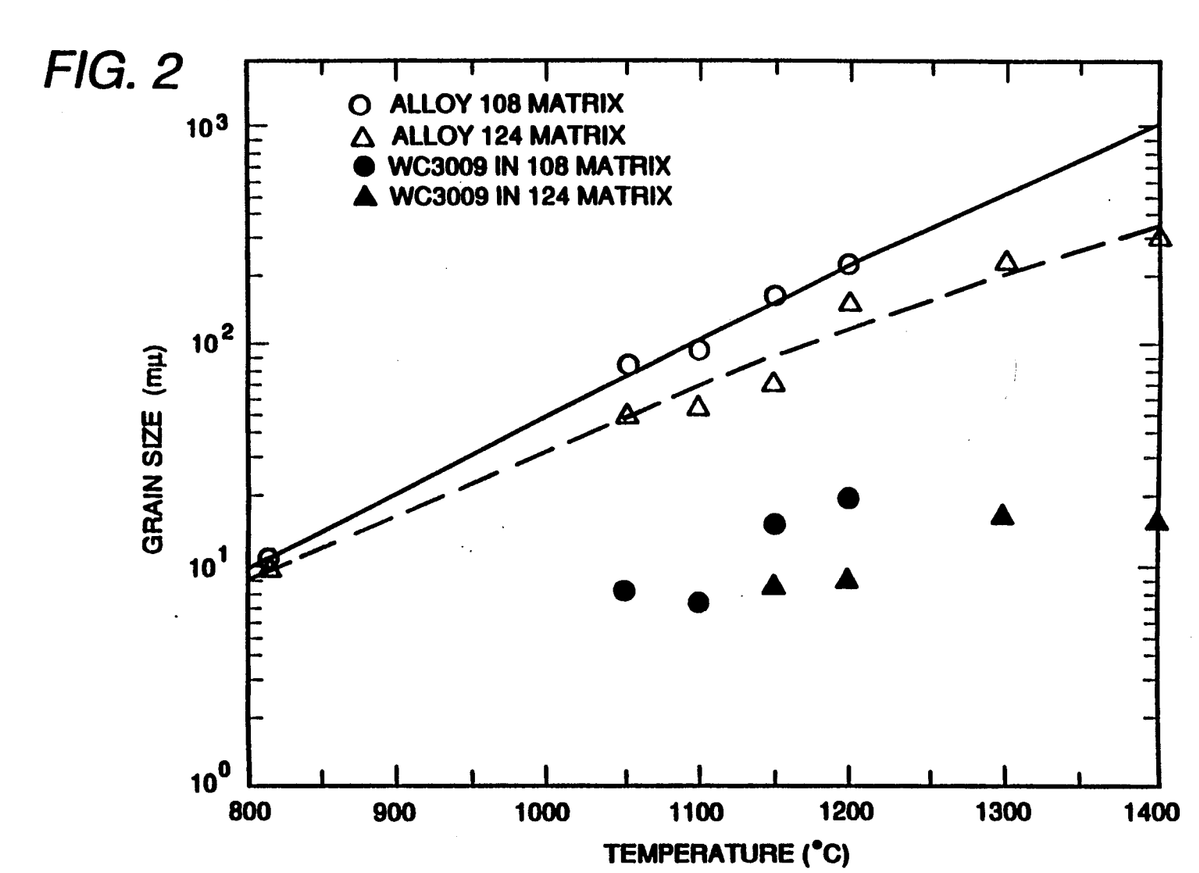
FIG. 2 is a graph in which grain size of a matrix and of the embedded reinforcement is plotted against heat treatment temperature.

A plot of data concerned with grain size in relation to heat treatment temperature is set forth in FIG. 2.

The interface between the fiber and the ID matrix and the grain boundaries in the fiber were heavily decorated with precipitates of hafnium oxide (HfO$_2$). It is presumed that the oxygen in the matrix casting and on the fiber surfaces as well as on the matrix machined surfaces reacted with the high hafnium concentrations in the WC3009 fibers.

Mechanical test bars were machined from the twice extruded composites after heat treatment at the 1100° C., 1200° C., and 1300° C. heat treatment temperatures. The test bar gage was 0.08 inches in diameter with the outer gage surface of the matrix being approximately 0.005 inches beyond the outer fiber surface, i.e., each fiber was at least 0.005 inches from the outer surface of the matrix member. The seven fibers were in a close-packed array having six outer fibers surrounding a central fiber on the axis of the test bar as illustrated in FIG. 1. All of the fibers were included within the 0.08 inch gauge diameter of the test bar. Tests were made of the bars as indicated in Table II immediately below:

TABLE II

Tensile Test Data for Composite of Continuous Fibers of WC3009 in Alloy Matrix

| Ex. | Matrix Alloy | Heat Treatment Temperature | Test Temp (°C.) | 0.2% YS (ksi) | UTS (ksi) | $EL_{ml}$ (%) | $EL_f$ (%) | RA (%) |
|---|---|---|---|---|---|---|---|---|
| 1 | Matrix 108 | 1200 C. | RT | 128 | 128 | 0.2 | 23 | 36 |
|   |            |         | 760 | 81 | 83 | 0.7 | 24 | 50 |
|   |            |         | 980 | 22 | 24 | 0.6 | 40 | 70 |
|   |            |         | 1200 | 10 | 11 | 0.8 | 39 | 96 |
| 2 | Matrix 124 | 1200° C. | RT | 131 | 131 | 0.2 | 22 | 35 |
|   |            |         | 760 | 83 | 92 | 1.8 | 13 | 14 |
|   |            |         | 980 | 35 | 35 | 0.2 | 59 | 76 |
|   |            |         | 1200 | 9 | 14 | 1.4 | 53 | 95 |
| 1 | Matrix 108 | 1100° C. | RT | 126 | 127 | 0.3 | 26 | 37 |
|   |            | 1300° C. | RT | No Yield | 40 | 0.02 | 0.02 | 0 |
| 2 | Matrix 124 | 1100° C. | RT | 134 | 134 | 0.2 | 26 | 45 |
|   |            | 1300° C. | RT | 126 | 127 | 0.2 | 3.4 | 6.6 |

In the above table:
YS designates yield strength in ksi (1000 pounds/in$^2$).
UTS designates ultimate tensile strength in ksi.
$EL_{ML}$ designates elongation (or strain) at maximum load (also known as uniform strain) in percent.
$EL_F$ designates elongation (or strain) at failure (also known as fracture strain).
RA designates reduction of area in percent.

It will be observed from the result listed in Table II that the ductility of samples heat treated at 1300° C. decreased sharply when compared to the ductility values achieved following heat treatment at 1100° C. or 1200° C.

Figure 3:
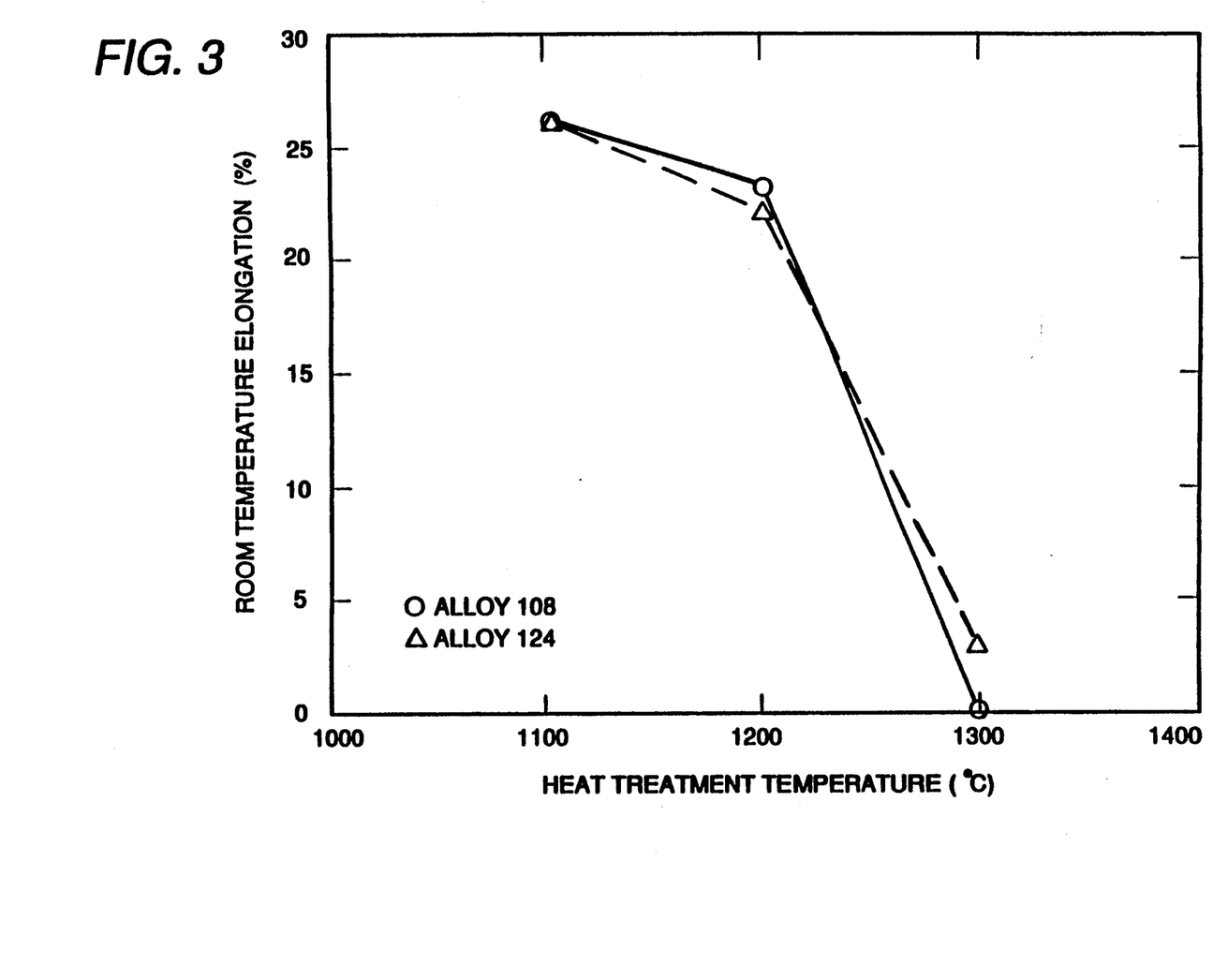
FIG. 3 is a graph in which composite room temperature elongation is plotted against heat treatment temperature.
Figure 4:
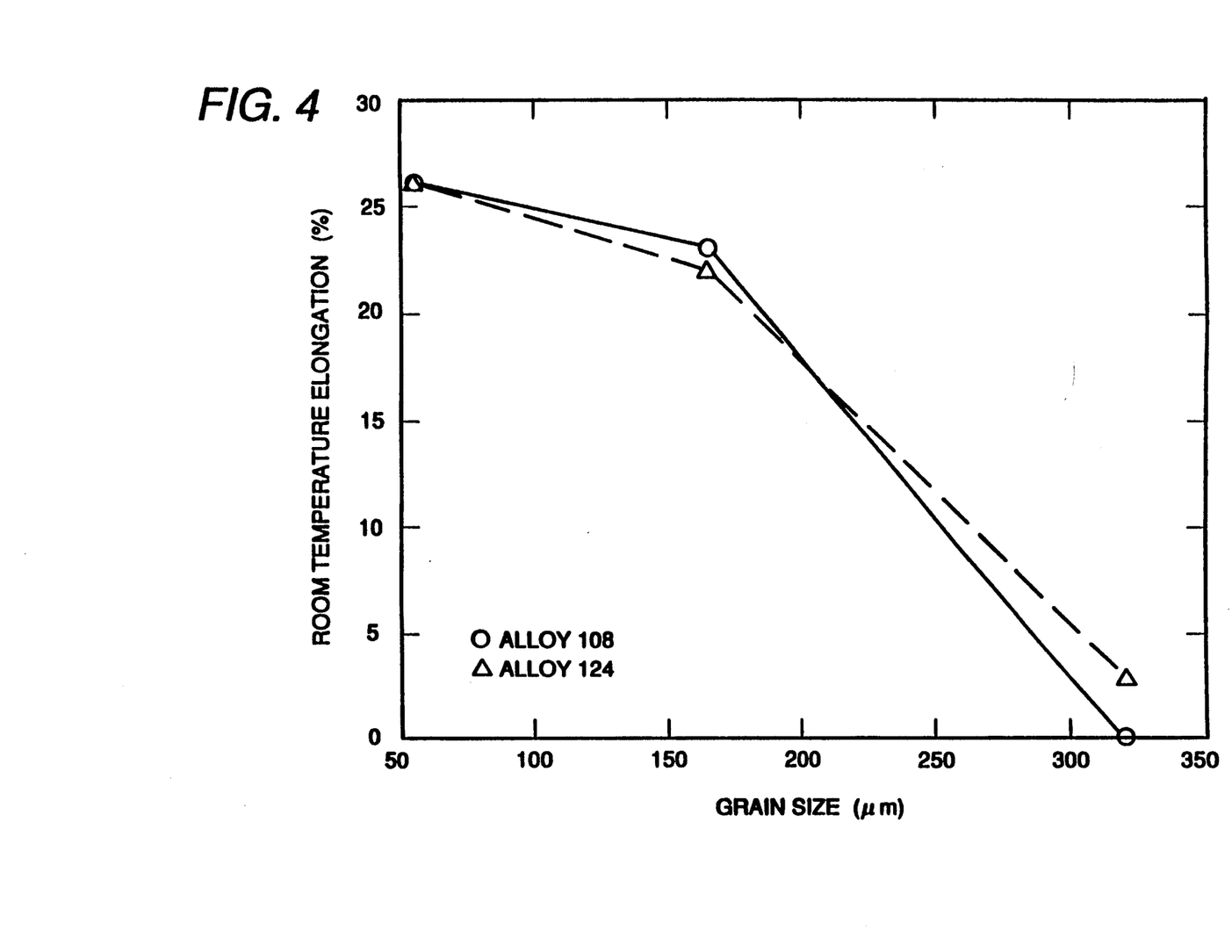
FIG. 4 is a graph in which composite room temperature elongation is plotted against grain size.

A plot of the data relating room-temperature elongation at failure to heat treatment temperature as set forth in Table II is presented in FIG. 3. A plot relating grain size to room-temperature elongation at failure is presented in FIG. 4.

Tensile strengths were essentially in conformity with a rule of mixtures calculation for the respective volume fractions of fiber and matrix. The volume fraction of the materials tested to produce the results listed in Table II were about 15.8 volume percent of the WC3009 reinforcing fibers, each of which had a diameter measurement of about 0.012 inches in the test bars subjected to testing. For the samples heat treated at 1100° C and at 1200° C, both composites exhibited room temperature ductilities of about 22% elongation with about a 35% reduction in area. It was observed that these ductilities were surprisingly high when compared to values of 7-12% typical of similar matrix compositions which contained no fibers. It is known that the WC3009 alloy is generally low in ductility, in the range of about 5% in a bulk form at room temperature, although the data which is available is only for the alloy with much coarser grain structures.

Figure 5:
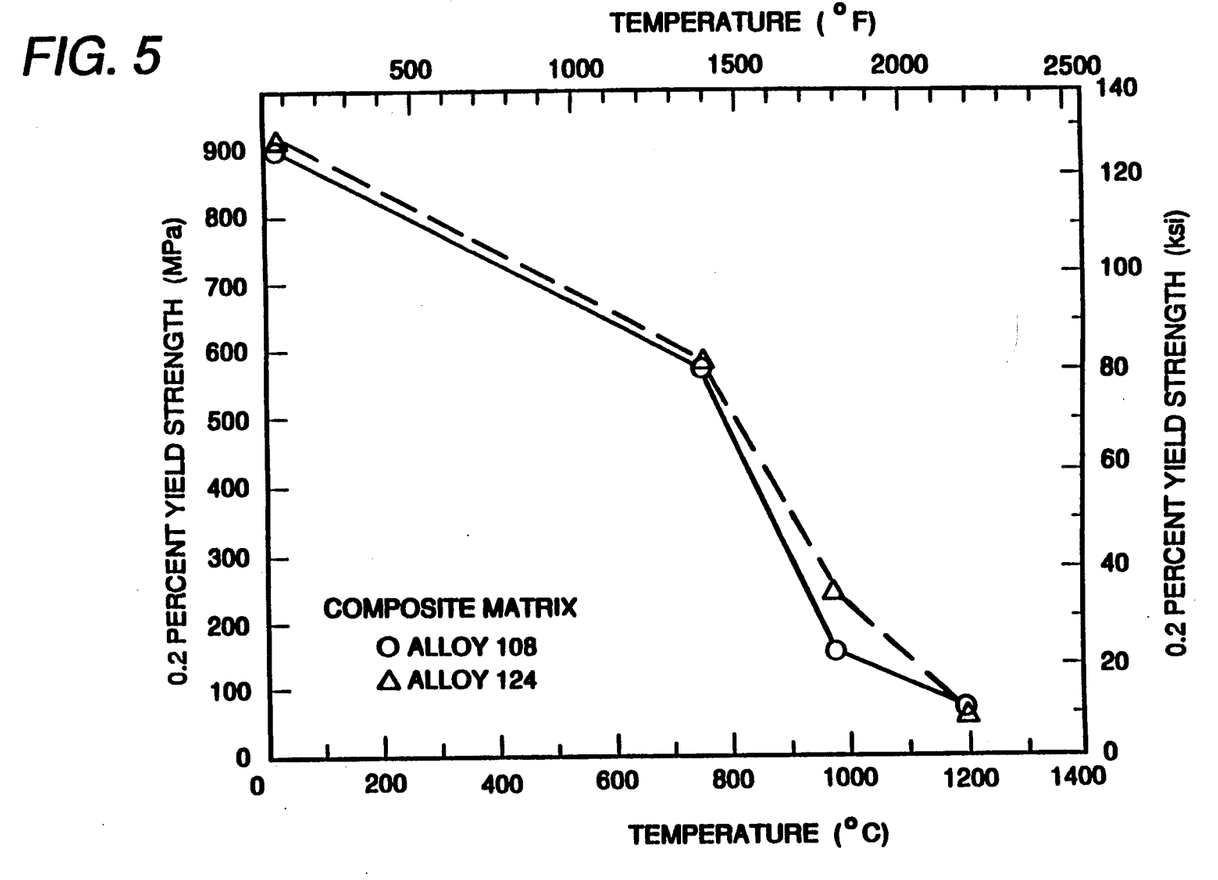
FIG. 5 is a graph in which composite yield strength is plotted against testing temperature.
Figure 6:
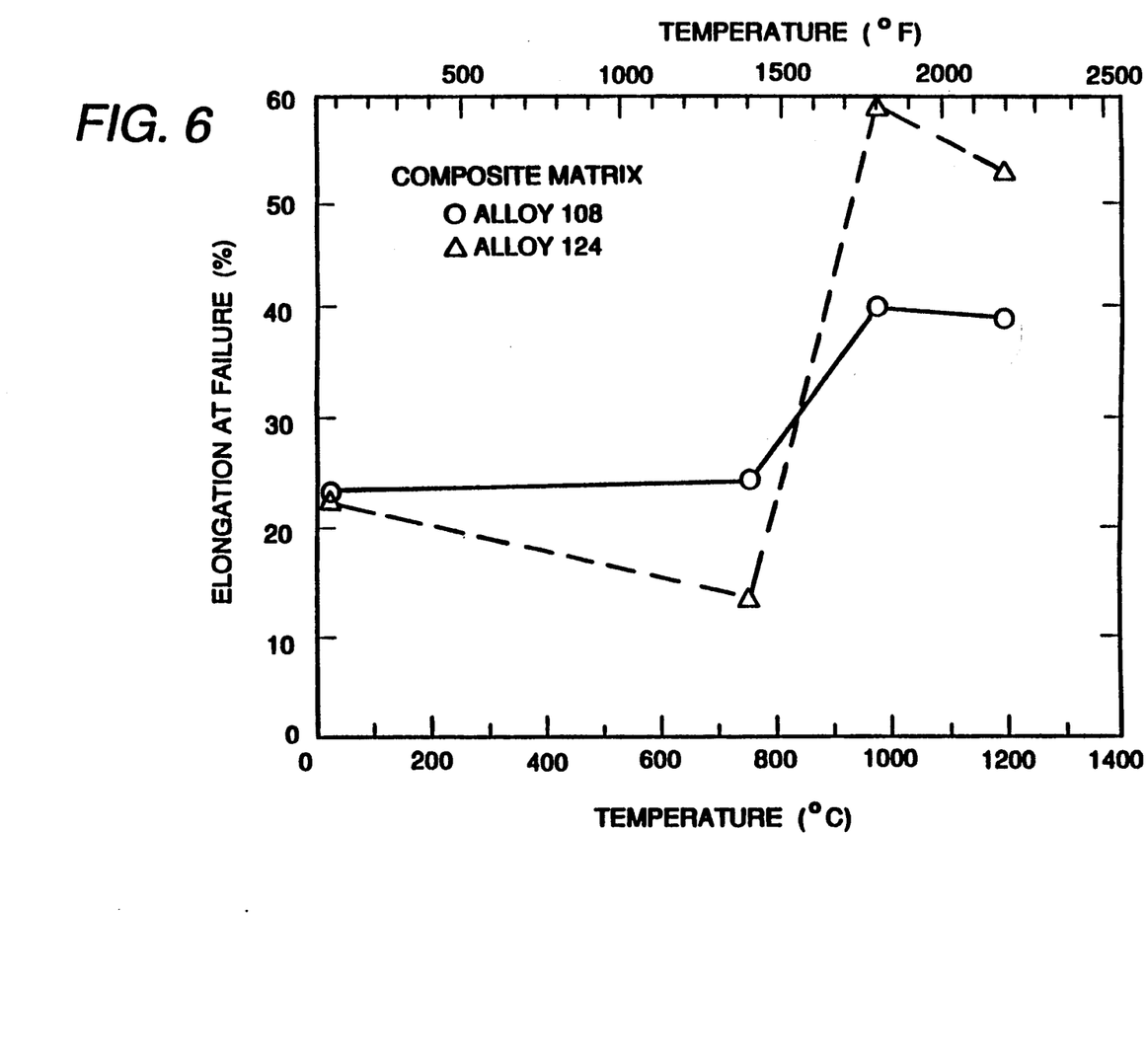
FIG. 6 is a graph in which composite elongation to failure is plotted against testing temperature.

Data relating yield strength to temperature is plotted in FIG. 5 and data relating percent elongation at failure to temperature for each composite is plotted in FIG. 6.

Rupture data for the continuous composite of WC3009 continuous fibers in the niobium based matrices were obtained by measurements made in an argon atmosphere at 982° C. essentially as listed in Table III immediately below:

TABLE III

Rupture Life Data at 982° C. for 15.8 v/o WC3009 Filament in Reinforced Composites

| Ex. | Continuous Composite with Matrix | Heat Treatment Temperature | Stress (ksi) | $EL_f$ (%) | RA (%) | Rupture life (hours) |
|---|---|---|---|---|---|---|
| 1 | 108 | 1100° C. | 9 | 64 | 82 | 23.3 |

TABLE III-continued

Rupture Life Data at 982° C. for 15.8 v/o WC3009 Filament in Reinforced Composites

| Ex. | Continuous Composite with Matrix | Heat Treatment Temperature | Stress (ksi) | $EL_f$ (%) | RA (%) | Rupture life (hours) |
|---|---|---|---|---|---|---|
|   | 108 | 1200° C. | 12 | No Data | No Data | 0.6 |
| 2 | 124 | 1100° C. | 9 | 81 | 89 | 20.8 |
|   | 124 | 1200° C. | 9 | 63 | 63 | 114.3 |
|   | 124 | 1300° C. | 9 | 56 | 79 | 43.1 |

As a matter of comparison, unreinforced alloys similar to the 108 matrix exhibit a rupture life at 985° C. of less than 25 hours at a stress of only 6 ksi. Correspondingly, an unreinforced alloy similar to the 124 matrix exhibited a life of 1.8 hours at 9 ksi.

For reinforced structures as described above, the best composite test life at equal stress was nearly 10 fold greater than the rupture life of a similar unreinforced composition.

The densities for the two composites are approximately 7 grams per cubic centimeter for the composite with the 108 matrix and 7.2 grams per cubic centimeter for the composite with the 124 matrix. Comparable density values for nickel and cobalt based alloys are 8.2 to 9.3 grams per cubic centimeter. Although the composites are much stronger in rupture than are wrought Ni and Co-base superalloys, the composites are still weaker than cast γ/γ' superalloys. The density reduced stress for 100 hours at 985° C. for the 124 composite is 1.25 (arbitrary units, ksi/g/cc), less than for cast alloys such as René 80 (density reduced stress of 1.84), but is much closer than is the case for unreinforced matrices (density-reduced stress of 0.75).

Rupture data obtained by measurements made in argon atmosphere at other temperatures are listed in Table IV immediately below:

TABLE IV

Rupture Life Data for
15.8 v/o WC3009 Filament in Reinforced Composites

| Ex. | Continuous Composite with Matrix | Heat Treatment Temperature | Rupture Life (hours At) 871° C. & 15 ksi | 1093° C. & 5 ksi | 1149° C. & 3 ksi |
|---|---|---|---|---|---|
| 1 | 108 | 1100° C. | 34.3 | 11.5 | 60.3 |
| 2 | 124 | 1100° C. | 81.6 | 16.1 | 500.5 |
|   | 124 | 1300° C. | 46.2 | 42.2 | 372.1 |

Typical wrought Ni and Co superalloys would last less than 100 hours at 1000° C. and 3 ksi. In terms of temperature capability, the reinforced composites having the niobium-titanium base matrices would survive for an equivalent time and stress at a temperature 80° C. to 200° C. hotter than wrought Ni or Co alloys.

Figure 7:
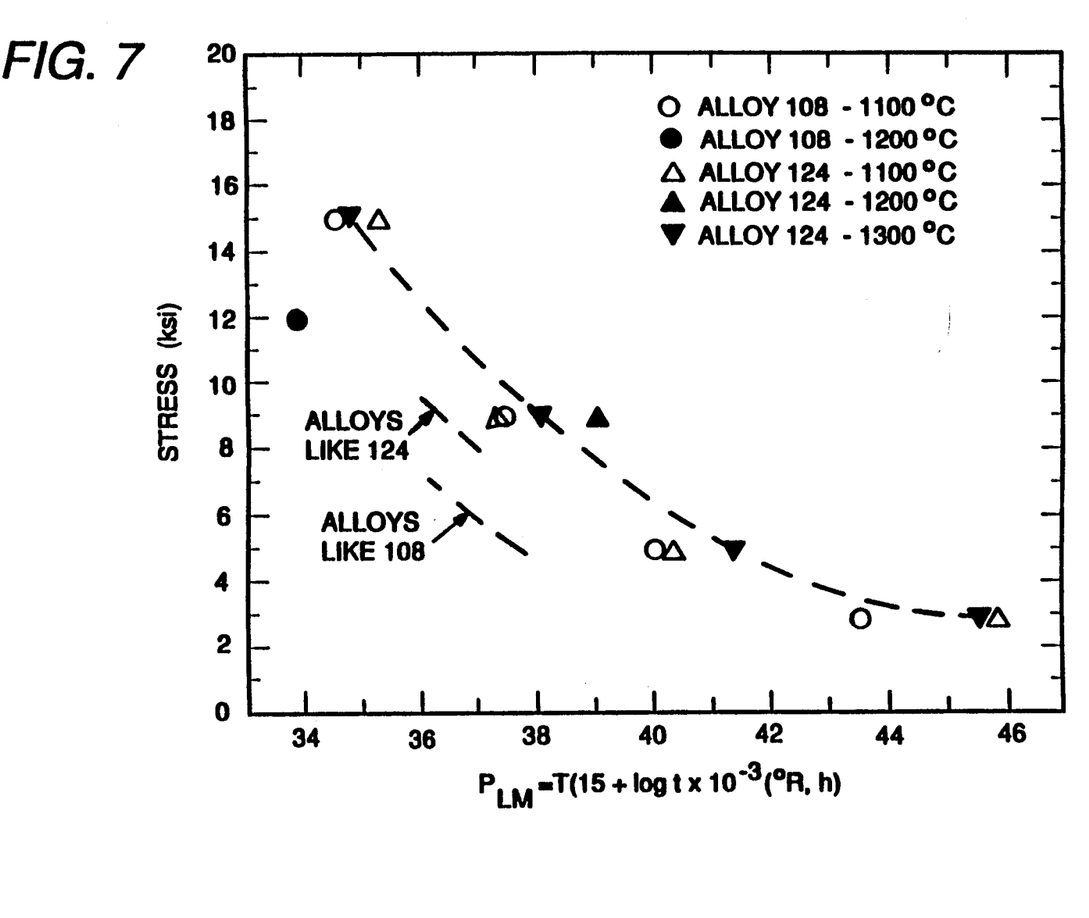
FIG. 7 is a Larson-Miller graph in which comparative data is given regarding the stress rupture life of the composites.

Data concerning the stress rupture life of the composites as described above are set forth in the Larson-Miller plot of FIG. 7.

It is evident from the property improvements achieved in the above examples that very good bonding is achieved between the matrix and reinforcing metals. Both of the ingredient metals of the matrix composites are ductile and both are of the body-centered cubic crystal form. Because of this high degree of compatibility between the matrix and the reinforcing components of the matrix composites, excellent composites are formed and very significant property improvements are achieved.

The applicants deem these compatibility factors and property improvement factors to be evidence of compatibility and property improvement in clad composites. The distinction between matrix composites of copending applications referenced above and the clad composites of the subject application is the degree of subdivision of the reinforcing component of the composite. In the case of the matrix composites, the degree of subdivision is high and consequently there is a large surface area of the reinforcing component of the matrix composites.

By contrast, in the clad composites of the subject invention, the reinforcing component has a simple geometric form such as a sheet or strip and consequently the surface area of the reinforcing component of the clad composites is relatively small when compared to the surface area of the reinforcing component of the matrix composites. The distinction between these two factors is discussed more extensively below.

The reinforcing metal of the above examples is not limited to the specific alloys employed in those examples. Some niobium base alloys, other than WC3009, which are suitable for use as core strengthening materials for clad composites include, among others, the following:

Other Commercially Available Niobium Base Alloys Useful as Strengthening Elements for the Niobium Base Cladding Metal Having the Formula Nb—Ti$_{31-48}$—Al$_{8-21}$

| Alloy Designation | Nominal Alloy Additions in Weight % |
|---|---|
| FS80 | 1 Zr |
| C103 | 10 Hf, 1 Ti, 0.7 Zr |
| SCb291 | 10 Ta, 10 W |
| B66 | 5 Mo, 5 V, 1 Zr |
| Cb752 | 10 W, 2.5 Zr |
| C129Y | 10 W, 10 Hf, 0.1 Y |
| FS85 | 28 Ta, 11 W, 0.8 Zr |
| SU16 | 11 W, 3 Mo, 2 Hf, 0.08 C |
| B99 | 22 W, 2 Hf, 0.07 C |
| AS30 | 20 W, 1 Zr |

Each of these commercially available alloys contains niobium as its principal alloying ingredient and each of these alloys has a body centered cubic crystal structure. Each of the alloys also contains the conventional assortments and concentrations of impurity elements inevitably present in commercially supplied alloys.

It will be understood that a reinforcing member can be formed from a combination of these alloys. For example, a reinforcing member can be formed as a composite of two or more strips, sheets, formed of two different alloys, which may be combined into a composite structure to be included within a cladding of the niobium base cladding metal as set forth above. In this way it is possible to have a combination of metals which have a unique combination of properties, for example, at different temperatures, and in this way to provide reinforcing structures adapted to serve unique functions within the clad outer envelope. A specific example of such a structure is one in which a composite of B66 and FS85 is clad by the cladding metal as set forth above. This combination would have better specific strength (strength divided by density) than would clad FS85 alone at 2000F, and would have better specific strength than would clad B66 alone at 2400° F.

The alloys of the above listing are alloys which are deemed to have sufficient high temperature strength and low temperature ductility to serve as the reinforcing element in composite structures having a niobium-titanium cladding as described above and having a composition as set forth in the following expression:

$$Nb\text{-}Ti_{31-48}\text{-}Al_{8-21}.$$

The form of the reinforcing elements of the strengthening alloy is a form in which there is preferably one small dimension. In other words, the strengthening element may be present as a rod or strip in which case the reinforcement has one large dimension and two small dimensions, or it may be present as a plate or a sheet-like element or elements, in which case the reinforcing structure has one small dimension and two larger dimensions.

A number of additional examples illustrate alternative methods of preparing the matrix composites of the cross-referenced applications.

EXAMPLE 3

A matrix-type composite structure was prepared by coextruding a bundle of round rods of matrix and reinforcement alloys.

The matrix (designated alloy 6) of the composite to be formed represented about ⅔ of the number of rods in the bundle and accordingly ⅔ of the volume of the composite. This matrix metal had a titanium to niobium ratio of 0.5.

The matrix contained 27.5 atom percent of titanium, 5.5 atom percent aluminum, 6 atom percent chromium, 3.5 atom percent hafnium, and 2.5 atom percent vanadium and the balance niobium according to the expression:

$$Nb\text{-}Ti_{27.5}\text{-}Al_{5.5}\text{-}Cr_6\text{-}Hf_{3.5}\text{-}V_{2.5}.$$

The rods of the reinforcing component of the composite were of an AS-30 alloy containing 20 weight percent (11.1 atom percent) of tungsten, 1 weight percent (1.1 atom percent) of zirconium, (11.1 a/o W, 1.1 a/o Zr) and the balance niobium according to the atom percent expression:

$$Nb\text{-}W_{11.1}\text{-}Zr_{1.1}.$$

Approximately 70 rods of reinforcement and 140 rods of matrix having diameters of 60 mils each were employed in forming the matrix composite. The 210 rods were placed in a sleeve of matrix metal. The sleeve and contents were enclosed in a can of molybdenum to form a billet for extrusion. The assembled billet and its contents were then processed through a 10 to 1 ratio extrusion. A section of the extruded product was cut out and this section was reprocessed again through a 10 to 1 ratio extrusion. A double extrusion of the rods was thus carried out. In doing so, the rods used as the starting materials were converted to fibers.

Figure 8:
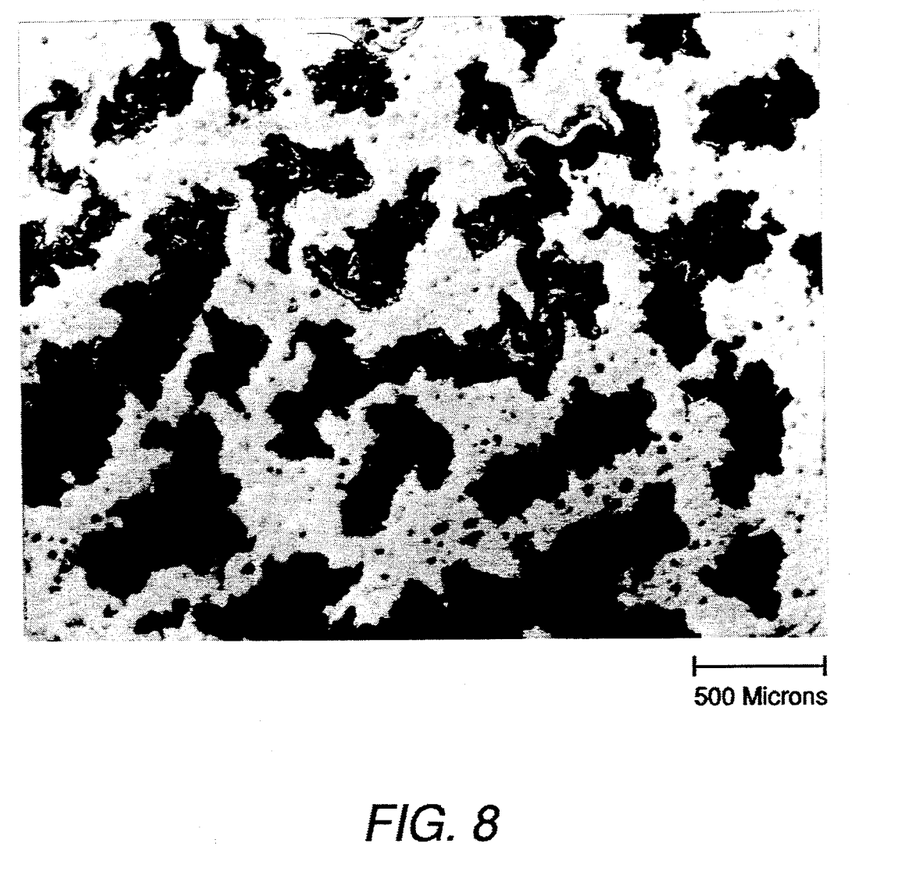
FIG. 8 is a micrograph of a cross section of a continuous composite structure.

Following the double extrusion, the nominal size of each reinforcing fiber was about 150 μm. FIG. 8 is a micrograph of a portion of the cross-section of the structure. It is evident from the micrograph that the rods had lost their identity as round rods. Further, the very irregular shape of the resulting strands formed from the rods within the composite had demonstrated that in a number of cases the elements which started as rods were deformed and in some cases joined with other elements to form the irregular pattern of matrix strands and reinforcement strands which is found in the micrograph of FIG. 8. This irregular cross-section resulted because no effort was made to restrain lateral movement of the rods during the extension, such as by shaping the extended rods or by filling the interstices with smaller diameter rods.

Standard tensile bars were prepared from the composite and from the matrix material and tensile tests were performed. The results are set forth immediately below in Table V.

TABLE V

Tensile Results of Continuous Fiber Reinforced and Matrix Alloys

| Ex. | Sample | Alloy | Temp (C) | 0.2% YS (ksi) | UTS (ksi) | EL$_{ml}$ (%) | EL$_f$ (%) | RA (%) |
|---|---|---|---|---|---|---|---|---|
|   |   | Composite |   |   |   |   |   |   |
| 3 | 91-12/A | AS-30/Alloy 6 | 70 | 121.0 | 121.0 | 0.2 | 0.2 | 1.5 |
|   | 91-12/B | AS-30/Alloy 6 | 760 | 78.1 | 89.3 | 4.8 | 20.6 | 27.0 |
|   | 91-12/C | AS-30/Alloy 6 | 980 | 43.7 | 44.3 | 3.8 | 48.5 | 50.0 |
|   | 91-12/D | AS-30/Alloy 6 | 1200 | 22.5 | 25.4 | 2.7 | 65.5 | 56.0 |
|   |   | Matrix |   |   |   |   |   |   |
|   | 91-32 | Alloy 6 | 70 | 132.4 | 132.4 | 0.1 | 23.5 | 46.0 |
|   | 91-32 | Alloy 6 | 760 | 83.1 | 92.1 | 1.7 | 48.3 | 64.0 |
|   | 91-32 | Alloy 6 | 980 | 42.1 | 42.7 | 0.3 | 95.2 | 95.0 |

TABLE V-continued

Tensile Results of Continuous Fiber Reinforced and Matrix Alloys

| Ex. | Sample | Alloy | Temp (C) | 0.2% YS (ksi) | UTS (ksi) | EL$_{ml}$ (%) | EL$_f$ (%) | RA (%) |
|---|---|---|---|---|---|---|---|---|
|   | 91-32 | Alloy 6 | 1200 | 20.4 | 20.4 | 0.2 | 83.2 | 57.0 |

Figure 9:
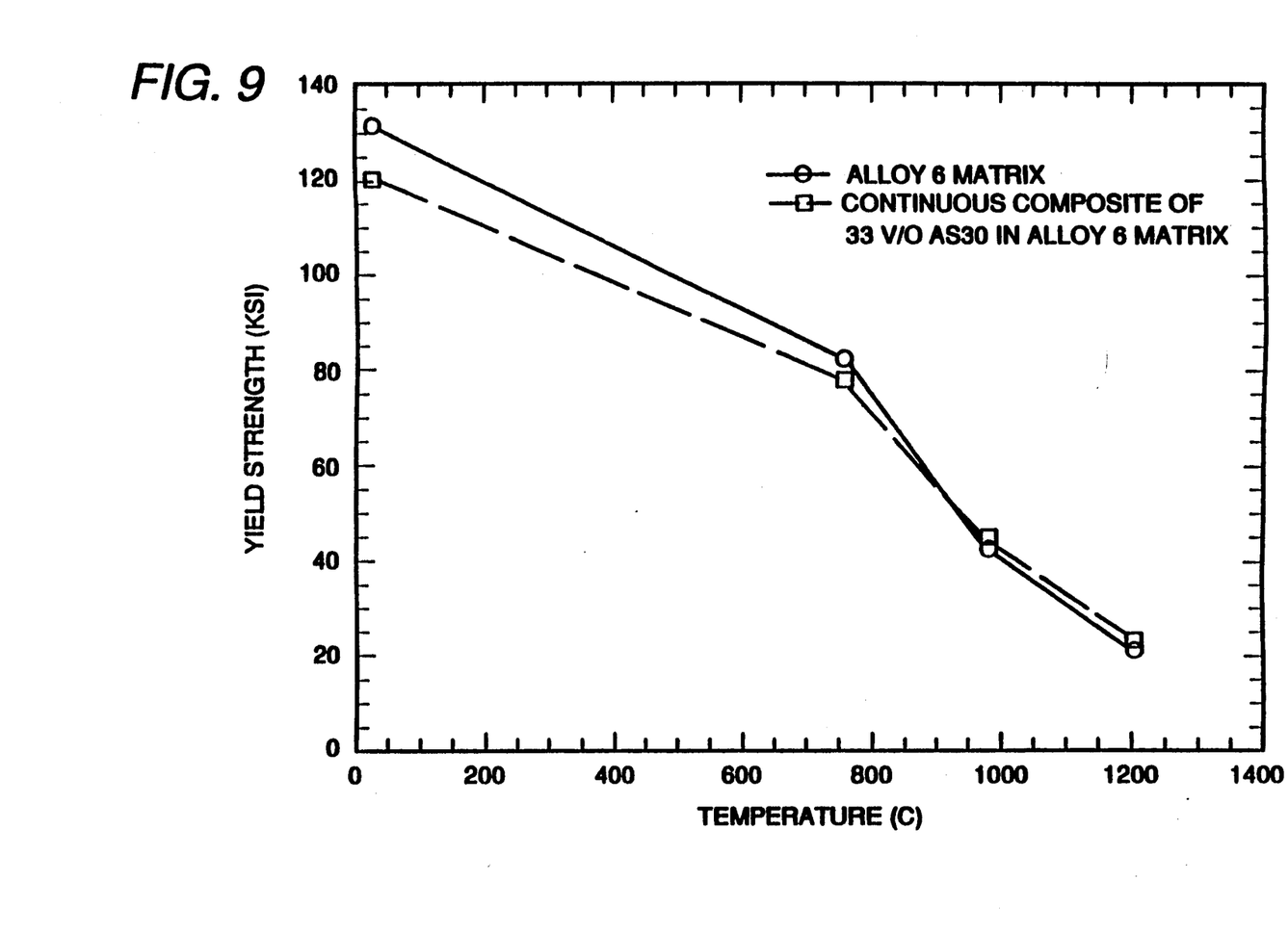
FIG. 9 is a graph in which yield strength is plotted against test temperature.

The yield strength data of this table is plotted in FIG. 9.

It is apparent from a comparison of the composite and matrix data of Table V that the matrix composite has lower strength than the matrix alone at lower temperatures but has higher strength than the matrix alone at higher temperatures. The ultimate strength of the matrix composite is about 20% higher than that of the matrix alone at the 1200° C. testing temperature.

Additional tests of the composite and of the matrix were carried out to determine comparative resistance to rupture. Test results are presented in Table VI immediately below.

TABLE VI

Rupture Results of Continuous Fiber Reinforced and Matrix Alloys

| Ex. | Sample | Alloy | Temperature (C) | Stress (ksi) | Life hours |
|---|---|---|---|---|---|
|   |   | Composite |   |   |   |
| 3 | 91-12 | AS-30/Alloy 6 | 980 | 12.50 | 1282.36 |
|   | 91-12 | AS-30/Alloy 6 | 1100 | 8.00 | 1928.20- Test Stopped |
|   |   | Matrix |   |   |   |
|   | 91-32 | Alloy 6 | 980 | 12.50 | 1.86 |
|   | 91-32 | Alloy 6 | 1100 | 8.00 | 0.57 |

A comparison of the data for the composite and the matrix makes clear that a highly remarkable improvement is found in the composite at both test temperatures. The improvement at the higher, 1100° C., test temperature is of the order of thousands of percent. In fact, the test was stopped because the beneficial effect of the reinforcement was already fully demonstrated.

The form of the reinforcement for the above examples is essentially continuous in that the reinforcement and the matrix are essentially coextensive when examined from the viewpoint of the extended reinforcing strands. Such composites are referred to herein as continuous composites or as matrix composites having continuous reinforcing members.

The reinforcement of these matrix composite structures is distributed in the sense that it is in the form of many elements having at least one small dimension. Such elements are referred to as strands of reinforcement. Such strands may be in the form of ribbon or ribbon segments or fibers or filaments or platelets or foil or threads or the like, all of which have at least one small dimension and all of which are referred to herein as strands.

As indicated above, the matrix composite structures are described in the copending application Ser. No. 816,164. The structures of the copending application are characterized generally by having larger numbers of smaller dimensioned, dispersed reinforcing elements contained within a matrix. Moreover, the smaller reinforcing elements of the copending application are well distributed within the matrix.

By contrast, the structures of the present invention are clad composite structures and the reinforcing element of these clad composite structures is not subdivided and distributed within the structure. The reinforcing elements are generally located centrally of the clad composite structure and are not subdivided to optimize their external surface area. In this respect the reinforcement of the clad composite structures of this invention are not distributed in the same sense that the divided reinforcing structures of the copending applications are distributed. The structures of this invention are distinct in that they are clad structures in that there is a single core element, or a plurality of core elements, each of which has a relatively large bulk for the amount of surface area containing the bulk. This contrasts with the distributed reinforcing elements of the copending application in that they can be multitudinous in number in the structure of the copending application Ser. No. 816,164 and their dimensions and overall surface areas are considerably smaller than they are in this subject application. The findings based on the experiments reported above relating to matrix composites are deemed to be applicable to the clad composites of this invention.

One way in which the difference in the reinforcing structures of the matrix-type composite as contrasted with the clad-type composite of the present invention may be brought out is by reference to the reinforcing factor R as discussed briefly below.

Generally the reinforcement of a clad composite must remain as reinforcement during the use of the composite article. By this is meant that the dimensions of the reinforcement within the cladding must be sufficiently large so that the reinforcing element does not diffuse into the cladding and lose its identity as a separate niobium based alloy. The extent of diffusion depends, of course, on the temperature of the composite during its intended use as well as on the duration of the exposure of the composite to a high temperature during such use. In the case of a composite formed of a cladding having a melting point of about 1900 degrees centigrade and a reinforcing phase having a melting point of about 2475 degrees centigrade, an initial estimate, based on conventional calculations is that such a composite structure having reinforcement elements of about 100μm in diameter or thickness would be stable against substantial interdiffusion for times in excess of 1000 hours at 1200 degrees centigrade, and for times approaching 1000 hours at 1400 degrees centigrade. Of course, the reinforcing core structures of clad composites are generally much larger than the 100μ and this diffusion phenomenon does not present as large a problem for clad composites as it does for the matrix composites of copending application Ser. No. 816,164, as referred to above.

Accordingly where the composite is to be exposed to very high temperatures it is preferred to form the composite with reinforcing elements having larger cross sectional dimensions so that any interdiffusion which does take place does not fully homogenize the reinforcing elements into the cladding. The dimensions of a reinforcing element which are needed for use at any particular combination of time and temperature can be determined by a few scoping experiments and from conventional diffusivity calculations since all of the parameters needed to make such tests, calculations and determination, based on the above text, are available to the intended user. Thus a reinforcing element having cross sectional dimensions as small as 5 microns can be used effectively for extended periods of time at temperatures below about 1000 degrees centigrade. However the same reinforcing element will be homogenized into the cladding if kept for the same time at temperatures above 1400 degrees centigrade.

Conversely the cladding on the external surface of the composite structure must be of sufficient thickness so that it does not diffuse into the reinforcing core of the structure so as to be absorbed by such diffusion and thereby to cause the cladding to lose its ability to protect the reinforcing core from oxidation and other environmental attack. The necessary minimum thickness dimensions of the cladding for particular use times and temperatures are determined in the same manner, as described above, as the minimum thickness dimensions of the reinforcing elements which are contained within the composite structure. It will be understood that the thickness of cladding actually used for any specific composite structure should be two or three or more times as thick as the minimum required based on the time and temperature exposures which the composite will see during its expected useful life in order to allow for temporary temperature excursions and similar events which can increase the degree of diffusion.

Generally for matrix composites of the cross-referenced applications listed above, it is desirable to have the reinforcing elements distributed within the matrix so that there is a relatively large interfacial area between the matrix and the reinforcing elements contained within the matrix. The extent of this interface depends essentially on the size of the surface area of the contained reinforcement. A larger surface area requires a higher degree of subdivision of the reinforcement.

As a convenience in describing the degree of subdivision of the reinforcement within a matrix composite, a reinforcement ratio, R, is used as explained in copending application Ser. No. 816,164. As explained, the reinforcement ratio, R, is the ratio of surface area of the reinforcement in square centimeters to the volume of the reinforcement in cubic centimeters. The reinforcement ratio is thus expressed as follows:

$$R = \frac{\text{Surface Area (square centimeters)}}{\text{Volume (cubic centimeters)}}$$

As an illustration of the use of this ratio consider a solid cube of reinforcement measuring one centimeter on an edge. This is one cubic centimeter of reinforcement. Its ratio, R, is the 6 square centimeters of surface area divided by the volume in cubic centimeters, i.e., 1 cc. So the ratio, R, is equal to 6. For a cube of reinforcement measuring 2 centimeters on an edge the surface area for each of the six surfaces of the cube is 4 square centimeters for a total of 24 square centimeters. The volume of a cube which measures two centimeters on an edge is eight cubic centimeters. So the ratio, R, for the two centimeter cube is 24/8 or 3. For a cube measuring three centimeters on an edge the ratio, R, is 54/27 or 2. From this data it is evident that as the bulk of reinforcement within a surface keeps increasing (and the degree of subdivision keeps decreasing) the ratio, R, keeps decreasing. Pursuant to the present invention what is sought is a composite structure having a lower degree of subdivision of the reinforcement rather than the higher degree described in copending application Serial No. 816,164. Generally, a reinforcement ratio of less than 50 is sought in clad composite structures of the present invention.

As a further illustration of the use of this ratio, consider a slab of reinforcement which is embedded in a cladding. The slab can be, for example, 40 cm long, 20 cm wide and 1 cm thick. The surface area of such a slab is 1720 sq cm and the volume is 800 cubic cm. The reinforcement ratio, R, for the slab is 1720/800 or 2.15. If the thickness of the slab is reduced in half then the ratio, R, becomes 1660/400 or 4 15. If the thickness of the slab is reduced again, this time to one millimeter (1 mm), the ratio, R, becomes 1612/80 or 20.15. Each of these structures when enveloped in a cladding as described above is within the scope of the present invention.

It should be understood that the reinforcement ratio, R, does not describe, and is not intended to describe the volume fraction, nor the actual amount of reinforcement, which is present within a composite. Rather the reinforcement ratio, R, is meant to define the degree of and the state of subdivision of the reinforcement which is present, and this degree is expressed in terms of the ratio of the surface area of the reinforcement to the volume of the reinforcement. A further illustration of the degree of subdivision of a body of reinforcement may be helpful.

As indicated above, a single body of one cubic centimeter of reinforcement has a surface area of 6 sq. cm. and a volume of 1 cubic centimeter (1 cc.). If the body is cut vertically parallel to its vertical axis 99 times at 0.1 mm increments to form 100 slices each of which is 0.1 mm in thickness, the surface area of the reinforcement is increased by 198 sq. cm.(2 sq. cm. for each cut) but the volume of the reinforcement is not increased at all. In other words the degree of subdivision, and hence the surface area, of the body has been increased but the volume has not been increased. In this illustration the reinforcement ratio, R, is increased from 6 for the solid cube to 204 for the sliced cube without any increase in the quantity of reinforcement.

Pursuant to the present invention it is desirable to have the reinforcement in a bulk form so that the reinforcement ratio is lower rather than higher. A reinforcement ratio, R, below 50 is desirable.

Also it is desirable to have the bulk reinforcement extend within the matrix to all those portions in which the improved properties are sought. For many clad composite structures the reinforcement should not extend to the outermost portions as these portions are exposed to the atmosphere. The cladding metal is the only metal of the clad composite which should be on the exterior of the composite and which should be exposed to the atmosphere at elevated temperatures. The outermost portions should preferably be the more protective cladding alloy:

$Nb-Ti_{31-48}-Al_{8-21}$.

Further, the reinforcement may be present in a volume fraction of greater than half of the composite. In this regard it is important that the cladding constitute the continuous external phase of the composite and not be a discontinuous phase.

The claimed structures of the Copending cross-referenced applications listed above are characterized by a high level of interfacial surface between the matrix material and the reinforcing material embedded within the matrix. Depending on the temperature at which a composite is to be used, the presence of such large interfacial areas may not always be advantageous. Where the use temperature is at the higher level, the fact that the two phases of the composite are mutually soluble can mean that prolonged exposures at high temperatures will cause the eventual disappearance of the composite and the composite will be replaced by a new, single phase composition of body centered cubic alloy.

The fact that both the matrix and the reinforcing alloy are body centered cubic is very important in the compositions of the listed cross-referenced applications as well as those of the present application in that the formation of intermetallic compositions, having other crystal forms and having inferior properties such as low ductility, is avoided.

In general, for matrix composites of the copending applications listed above, where the reinforcement ratio R is high and the distribution of the reinforcing alloy is of a fine scale, then the lower is the temperature and the shorter is the time of exposure before the matrix composite strengthening is reduced as the reinforcing elements are dissolved.

This latter relationship of size of reinforcing elements to use temperature and time can be illustrated with reference to structural constraints actually found in jet engine parts. For many engine components as used in the hot section of a jet engine, the wall thickness may be in a range of 0.04 inches or less. To maintain a 0.004 to 0.005 inch layer of oxidation resistant metal at the surface, the composite core may be restricted to the order of 0.03 inches. In such structures the use of highly distributed reinforcing alloy presents a problem of dissolution and eventual disappearance of the reinforcing elements because of the diffusion which occurs and because of the mutual solubility of the matrix and reinforcing elements. For the highest service times and temperatures accordingly it is difficult, because of such restrictions, to achieve the very large interfacial surface areas with high reinforcement ratios above 50 and above 100 as prescribed in the pending cross-referenced patent applications.

Pursuant to the present invention, the structures which are provided are structures which are useful for the highest temperatures and the longest time of service. These structures may have a single layer of reinforcement and a cladding layer enveloping the reinforcement formed of the preferred lower density cladding alloy having a higher resistance to oxidation. The single layer of reinforcement may be present as a continuous sheet or as a layer of multiple side by side strip-like phases or as a layer of pancake-like reinforcements or as a perforated sheet or other structures that lend themselves to particular applications within the engine structure. Such structures allow for reinforcement thicknesses which are much greater than for the multilayered configuration of foils, ribbons, fibers, etc. as described and said forth in the pending matrix based applications listed in the cross-reference section above. Because of the greater reinforcement or core thickness, these clad structures should survive thermal excursions to higher temperatures for longer times without substantial loss of the reinforcement strengthening due to interdiffusion.

What is provided for this illustrative exemplary thin reinforced sheet structure pursuant to the present invention is a thin clad structure having a higher density, stronger, reinforcing, niobium alloy embedded in a single layered configuration of sheet strip or other form, within a lower density, lower strength niobium based alloy cladding having a composition according to the following expression:

Nb-Ti$_{31-48}$-Al$_{8-21}$.

What is claimed is:

1. A composite article adapted for use at temperatures of 1000° C. or above comprising at least one ductile reinforcing element having a reinforcement ratio of 50 or less formed of a niobium base alloy of body centered cubic crystal form, bonded to a cladding of an alloy comprising in atom percent Nb$_{balance}$-Ti$_{31-48}$-Al$_{8-21}$, said composite article being ductile and having higher tensile strength and rupture strength at temperatures above 1000° C. than the cladding alloy.

2. The article of claim 1 wherein the cladding alloy comprises, in atom percent
   Nb - balance
   Ti - 32 to 38
   Al - 9.5 to 18.5.

3. The article of claim 1 where the cladding alloy comprises in atom percent:
   Nb = balance
   Ti = 33 to 36
   Al = 10 to 16.

4. An article according to claim 1 wherein the reinforcing element comprise at least 50 volume percent of the article and a thickness of at least 100 microns.

5. An article according to claim 1 wherein the niobium base alloy comprises, in atom percent:
   tungsten = 11.1
   zirconium = 1.1
   niobium = balance.

6. An article according to claim 1 in which the niobium base alloy comprises in weight percent:
   tungsten = 9
   hafnium = 30
   niobium = balance.

* * * * *